(12) United States Patent
Okumura

(10) Patent No.: US 8,648,911 B2
(45) Date of Patent: Feb. 11, 2014

(54) COMMUNICATION SYSTEM, CONTROL DEVICE, AND RECEPTION DEVICE

(75) Inventor: Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 12/920,166

(22) PCT Filed: Mar. 2, 2009

(86) PCT No.: PCT/JP2009/053808
§ 371 (c)(1),
(2), (4) Date: Aug. 30, 2010

(87) PCT Pub. No.: WO2009/113415
PCT Pub. Date: Sep. 17, 2009

(65) Prior Publication Data
US 2011/0007160 A1    Jan. 13, 2011

(30) Foreign Application Priority Data

Mar. 10, 2008  (JP) .................................. 2008-059984

(51) Int. Cl.
*H04N 9/00* (2006.01)

(52) U.S. Cl.
USPC ........................................................ 348/143

(58) Field of Classification Search
None
See application file for complete search history.

(56) References Cited

U.S. PATENT DOCUMENTS

| 5,161,178 | A  | * | 11/1992 | Honda et al. | ........... | 378/98.12 |
| 6,240,121 | B1 | * | 5/2001  | Senoh        | ........... | 375/130   |
| 7,636,451 | B2 | * | 12/2009 | Isogai        | ........... | 382/100   |
| 7,970,164 | B2 | * | 6/2011  | Nakamura et al. | ....... | 382/100   |
| 8,218,812 | B2 | * | 7/2012  | Sugimoto et al. | ....... | 382/100   |
| 2004/0005076 | A1 | * | 1/2004 | Hosaka et al. | ........ | 382/100   |
| 2007/0071282 | A1 |   | 3/2007 | Isogai        |            |           |
| 2010/0067057 | A1 | * | 3/2010 | Guo et al.    | ........ | 358/3.06  |

FOREIGN PATENT DOCUMENTS

| JP | 11-341452    |   | 12/1999 |
| JP | 2004-172758  |   | 6/2004  |
| JP | 2006-020204  |   | 1/2006  |
| JP | 2007-036833  |   | 2/2007  |
| JP | 2007-104636  |   | 4/2007  |
| JP | 2007-163233  |   | 6/2007  |
| WO | WO 2007/015452 |   | 2/2007 |
| WO | WO 2007015452 | * | 2/2007 |
| WO | WO 2008/015905 |   | 2/2008 |

OTHER PUBLICATIONS

International Search Report, PCT/JP2007/064096, Aug. 21, 2007.

* cited by examiner

*Primary Examiner* — Joseph Ustaris
*Assistant Examiner* — Zhubing Ren
(74) *Attorney, Agent, or Firm* — Young & Thompson

(57) ABSTRACT

A control device divides one frame into plural sub-frames, distributes image signals of an embedded image, which is provided to only specific users, to the plural sub-frames such that a sum of signal levels in the one frame is zero, and superimposes the image signals on an image signal of a basic image provided to unspecified people and causes a display device to display the embedded image. The reception device shoots an image displayed on the display device in each period that is the same as the period of the sub-frame and calculates the difference between two image signals obtained in each period that is the same as the period of the sub-frame to acquire and display an image signal of the embedded image.

6 Claims, 14 Drawing Sheets

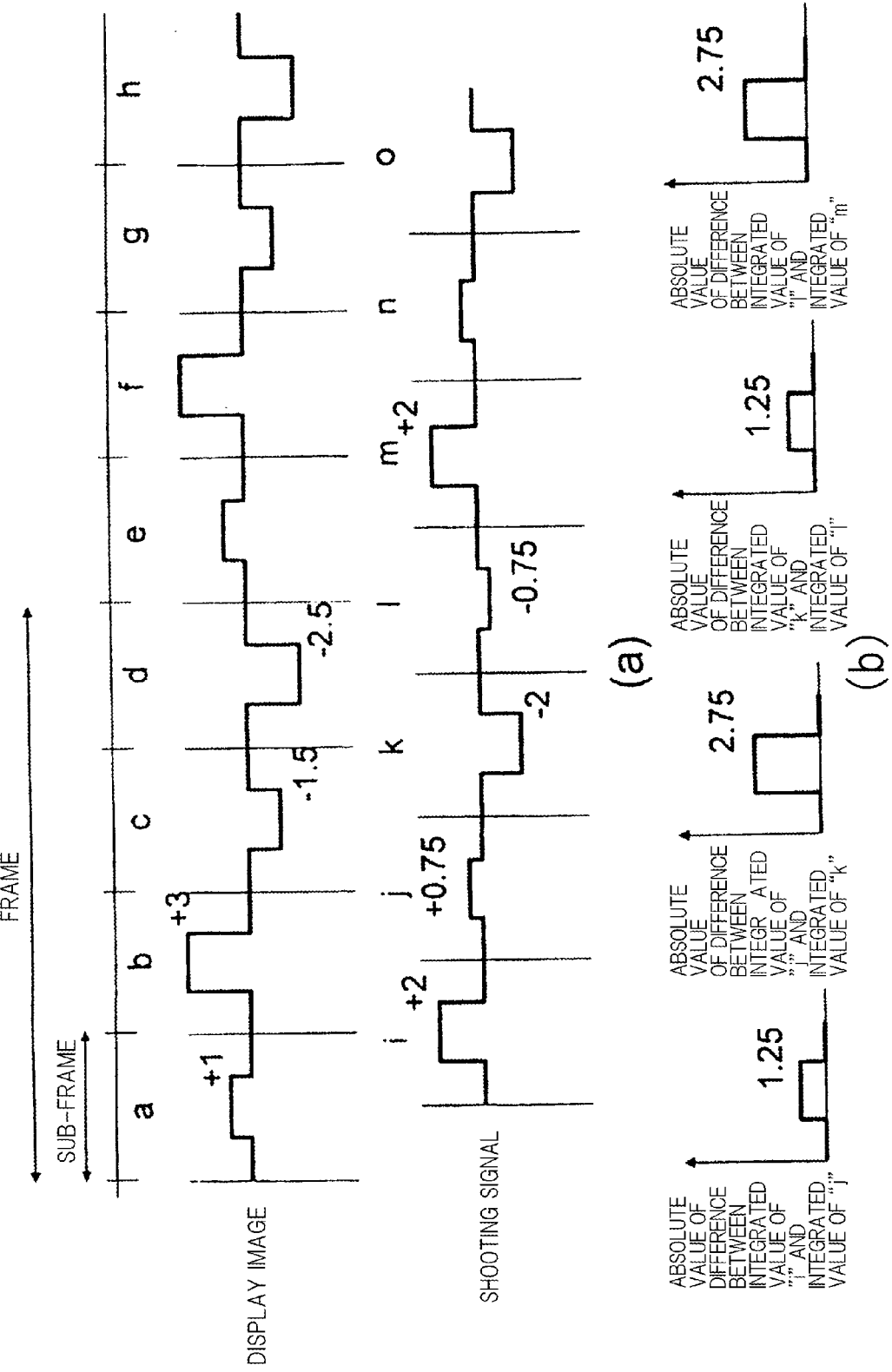

COMMUNICATION SYSTEM, CONTROL DEVICE, AND RECEPTION DEVICE

TECHNICAL FIELD

The present invention relates to a communication system that transmits information with images or moving images displayed on a display or the like and a control device and a reception device used in the communication system.

BACKGROUND ART

As a visible light communication technique for transmitting information with images or moving images displayed on a display or the like, there is known a system that displays a specific two-dimensional code (QR code) in a part of a display image, picks up an image of the two-dimensional code with a camera of a cellular phone or the like, and receives information.

For example, Japanese Laid-Open Patent Application No. 2007-163233 describes a configuration for generating, when a car navigation system detects abnormality, failure diagnosis data including an abnormal signal indicating the abnormality, converting the failure diagnosis data into a symbol code (a barcode or a two-dimensional code) and displaying the symbol code on a display device, and allowing a user to visually recognize the failure diagnosis data by reading the displayed symbol code with a portable terminal device.

Japanese Laid-Open Patent Application No. 2006-020204 describes a configuration for reading a two-dimensional code printed on a display medium with a terminal device, accessing a server apparatus, which provides content such as images and sound, specified by the information of the read two-dimensional code, and acquiring various contents.

However, in the visible light communication techniques of the background art explained above, there is a problem in that, for example, when the two-dimensional code is displayed on a large display used in the street, the two-dimensional code spoils the appearance because the two-dimensional code occupies a part of an image (a public image) of an advertisement or the like displayed to the public.

As means for coping with such a problem, there is a so-called secure display technique in which a display device that displays, in a time division manner, a public image and an image provided to only specific users (a private image) and an optical shutter that transmits light in synchronization with display timing for the private image are combined.

In the secure display technique, a public image provided to unspecified people, a private image provided to only specific users, and a reverse image of the private image are displayed in a time division manner in one frame by the display device and the optical shutter present in front of the users is switched to a transmission state in synchronization with display timing for the private image. Consequently, only the private image is visually recognized by the users who use the optical shutter and only the public image is recognized by the unspecified people (public) who are present around the users and do not use the optical shutter because the private image is superimposed on the reverse image and changed to a half-tone (gray) image.

If the secure display technique is utilized, it is possible to provide, while providing the unspecified people with the public image, users, who use the optical shutter, with various kinds of information using the private image. Therefore, the appearance of the public image is not spoiled.

However, in the secure display technique, since the optical shutter is necessary to visually recognize the private image as explained above, users to whom the private image can be provided are limited. In general visible light communication, it is desirable that various kinds of information can be more easily provided to a large number of users by the private image.

For example, when an advertisement or the like is displayed by a public image and a URL (Uniform Resource Locator) of a server apparatus that provides, with a private image, detailed information of a commodity displayed by the public image, is displayed by a two-dimensional code or the like, convenience is low in a system that requires the optical shutter.

In the secure display technique, it is necessary to transmit a synchronization signal, which synchronizes with the display of the private image, from the display device to the optical shutter, to transmit only the private image displayed on the display device by the optical shutter and interrupt the public image and the reverse image.

However, in the visible light communication, when various kinds of information are acquired from an image displayed on, for example, a large display set in the distance, since users are not always in an environment in which the users can receive a synchronization signal, it is desired that it is possible to easily provide the users with the information without using the synchronization signal unlike the secure display technique.

SUMMARY

Therefore, it is an object of the present invention to provide a communication system that can perform visible light communication with simple means without spoiling the appearance of a public image and without using a synchronization signal or the like and a control device and a reception device used in the communication system.

In order to achieve the above-described object, a communication system of an exemplary aspect of the present invention includes:

a control device that divides one frame into plural sub-frames, distributes image signals of a first image to the plural sub-frames such that the sum of signal levels in the one frame is zero, superimposes the image signals on an image signal of a second image, and outputs the image signals;

a display device that displays, for each of the sub-frames, an image based on the image signals output from the control device; and a reception device that shoots an image displayed on the display device in each period same as the period of the sub-frames and calculates the difference between two image signals obtained in each period which is the same as the period of the sub-frames to acquire and display the image signals of the first image.

A control device in the exemplary aspect of the present invention is a control device that outputs an image signal for dividing one frame into plural sub-frames to display the frame, the control device including:

a level modulating unit that generates image signals for each of the sub-frames of a first image to be distributed to the plural sub-frames and displayed such that a sum of signal levels in the one frame is zero; and a signal combining unit that superimposes, for each of the sub-frames, the image signals of the first image on an image signal of a second image.

A reception device in the exemplary aspect of the present invention is a reception device that shoots an image displayed on a display device, which divides one frame into plural sub-frames and displays a first image and a second image, and extracts and displays the first image or the second image, the reception device including:

a camera unit that shoots the image displayed on the display device in each period which is the same as the period of the sub-frames;

a sub-frame memory that sequentially stores image signals output from the camera unit in each period which is the same as the period of the sub-frame; and a subtracter that calculates the difference between two image signals stored in the sub-frame memory and outputs an image signal of the first image.

BRIEF DESCRIPTION OF THE DRAWINGS

FIG. 14 is a schematic diagram showing an operation example of the communication system according to the fourth exemplary embodiment.

EXEMPLARY EMBODIMENT

The present invention is explained below with reference to the drawings.

First Exemplary Embodiment

Figure 1:
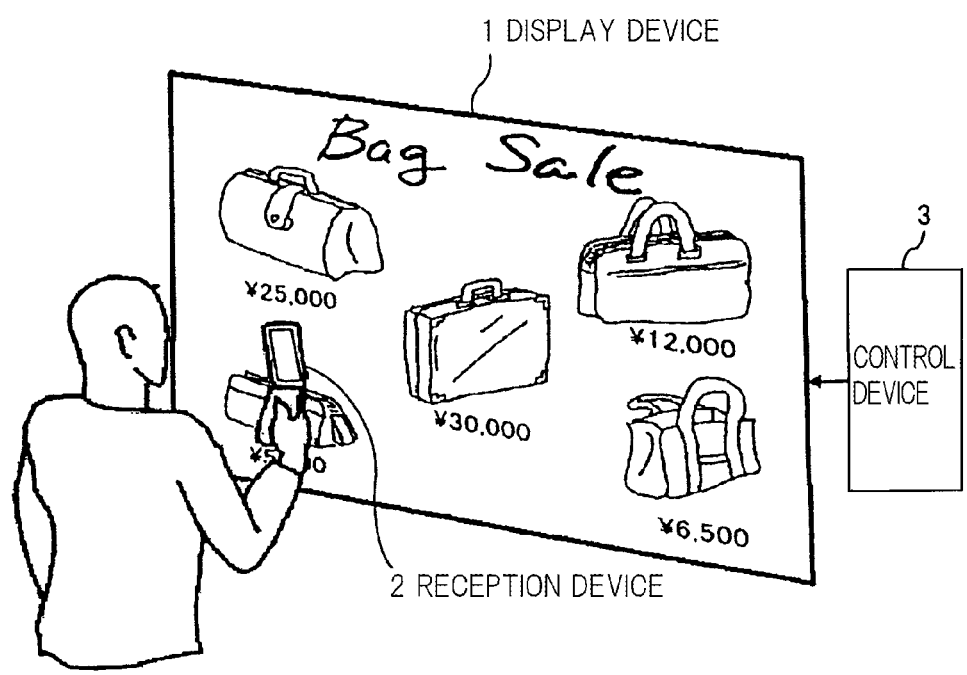
FIG. 1 is a schematic diagram showing a configuration example of a communication system according to the present invention.

FIG. 1 is a schematic diagram showing a configuration example of a communication system according to the present invention.

As shown in FIG. 1, the communication system according to the present invention includes display device 1 that displays a basic image (equivalent to the public image of the secure display technique) that is an image of an advertisement or the like provided to users and an embedded image (equivalent to the private image of the secure display technique) that is an image provided to only specific users, control device 3 that outputs an image signal for causing display device 1 to display an image, and reception device 2 owned by a user that extracts and displays the basic image or the embedded image from the image displayed on display device 1. A "first image" described in claims corresponds to the embedded image and a "second image" corresponds to the basic image.

Control device 3 divides one frame into plural sub-frames and causes display device 1 to display a basic image in the sub-frames and distributes image signals of an embedded image to the sub-frames such that the sum of signal levels in the one frame is zero, superimposes the image signals of the embedded image after the distribution on an image signal of the basic image, and causes display device 1 to display the basic image and the embedded image. "A sum of signal levels is zero" indicates that, when luminance values of pixels corresponding to one another of the image signals are added up, added-up values have a fixed luminance value (e.g., half-tone gray) in all the pixels. Therefore, a user who looks at an image displayed on display device 1 cannot see the embedded image because the embedded image of the sub-frames is time-integrated and visually recognized.

Display device 1 displays, for each of the sub-frames, an image based on the image signals output from control device 3.

Reception device 2 shoots an image displayed on display device 1 in each period which is the same as a period of the sub-frames, calculates the difference between two image signals obtained in the each period to acquire and display the image signals of the embedded image, and adds up the image signals obtained in the each period to acquire and display the image signal of the basic image.

In the first exemplary embodiment, one frame of an image displayed on display device 1 is divided into, for example, three sub-frames. Control device 3 causes display device 1 to display the basic image in a first sub-frame, superimposes the image signals of the embedded image on the image signal of the basic image, for example, in a positive direction and causes display device 1 to display the embedded image in a second sub-frame, and superimposes the image signals of the embedded image on the image signal of the basic image at the same signal level as the embedded image in the second sub-frame in a negative direction and causes display device 1 to display the embedded image in a third sub-frame. In this case, the user who looks at the display image on display device 1 perceives only the basic image because the embedded image in the positive direction displayed in the second sub-frame and the embedded image in the negative direction displayed in the third sub-frame are offset (equivalent to combining the reverse image with the so-called private image).

The image signals of the embedded image superimposed on the basic image in the sub-frames only have to able to be distributed such that a sum of signal levels in the one frame is zero. A sub-frame in which the image signal of the embedded image is superimposed on the image signal of the basic image in the positive direction or the negative direction may be any one of the first to third sub-frames.

On the other hand, reception device 2 according to the first exemplary embodiment shoots, with a camera included in reception device 2, an image displayed on display device 1 in each period that is the same as the period of the sub-frame. At this point, if an image signal corresponding to a sub-frame shot first by the camera (the first sub-frame), an image signal corresponding to a sub-frame shot second (the second sub-frame), and an image corresponding to a sub-frame shot third (the third sub-frame) are added up, the image signal of the basic image is obtained. If the difference between the image signals corresponding to the first sub-frame and the second sub-frame or the difference between the image signals corresponding to the first sub-frame and the third sub-frame is calculated, the image signals of the embedded image are obtained.

Figure 2:
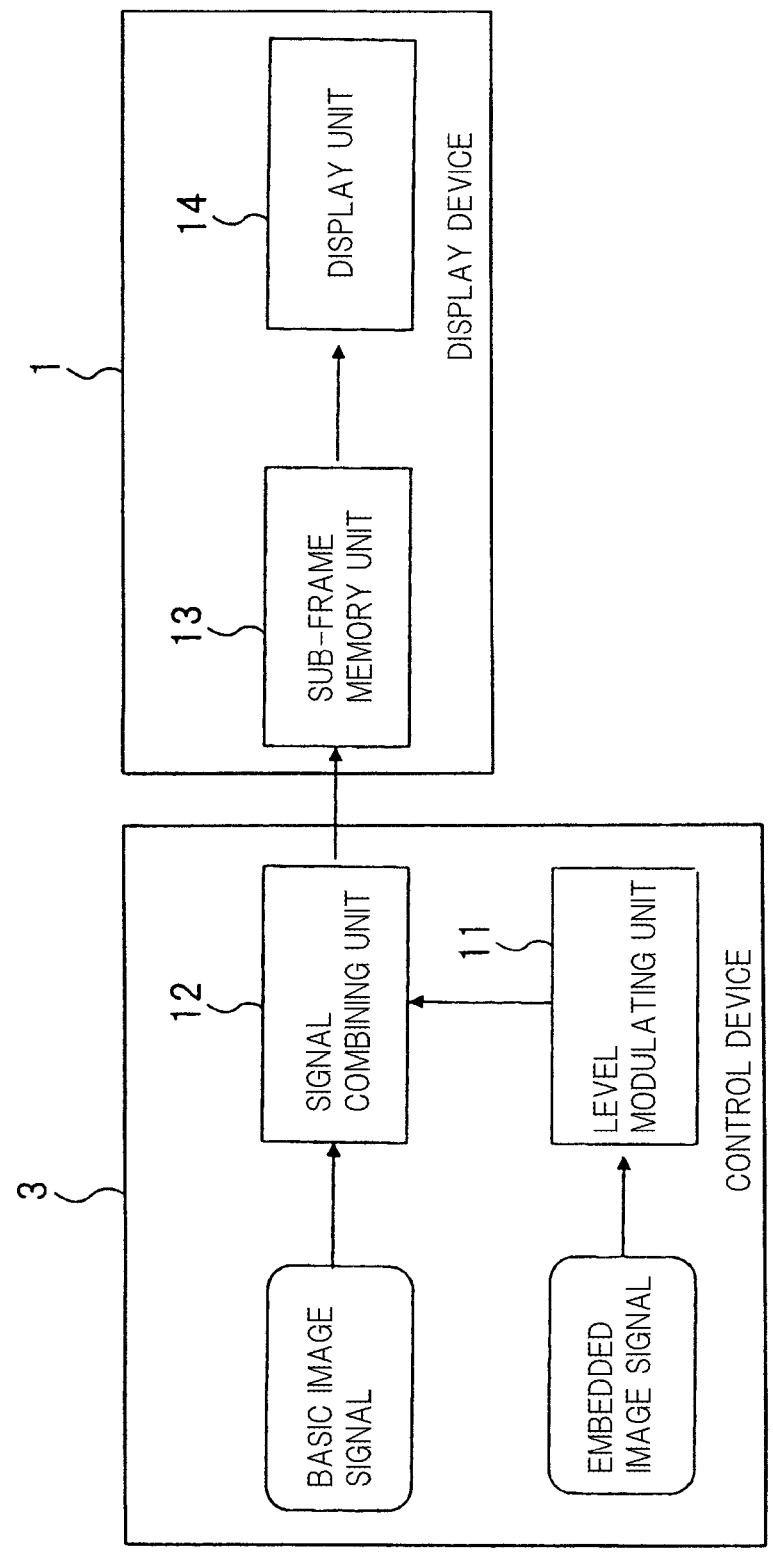
FIG. 2 is a block diagram showing a configuration example of a display device and a control device shown in FIG. 1.
Figure 3:
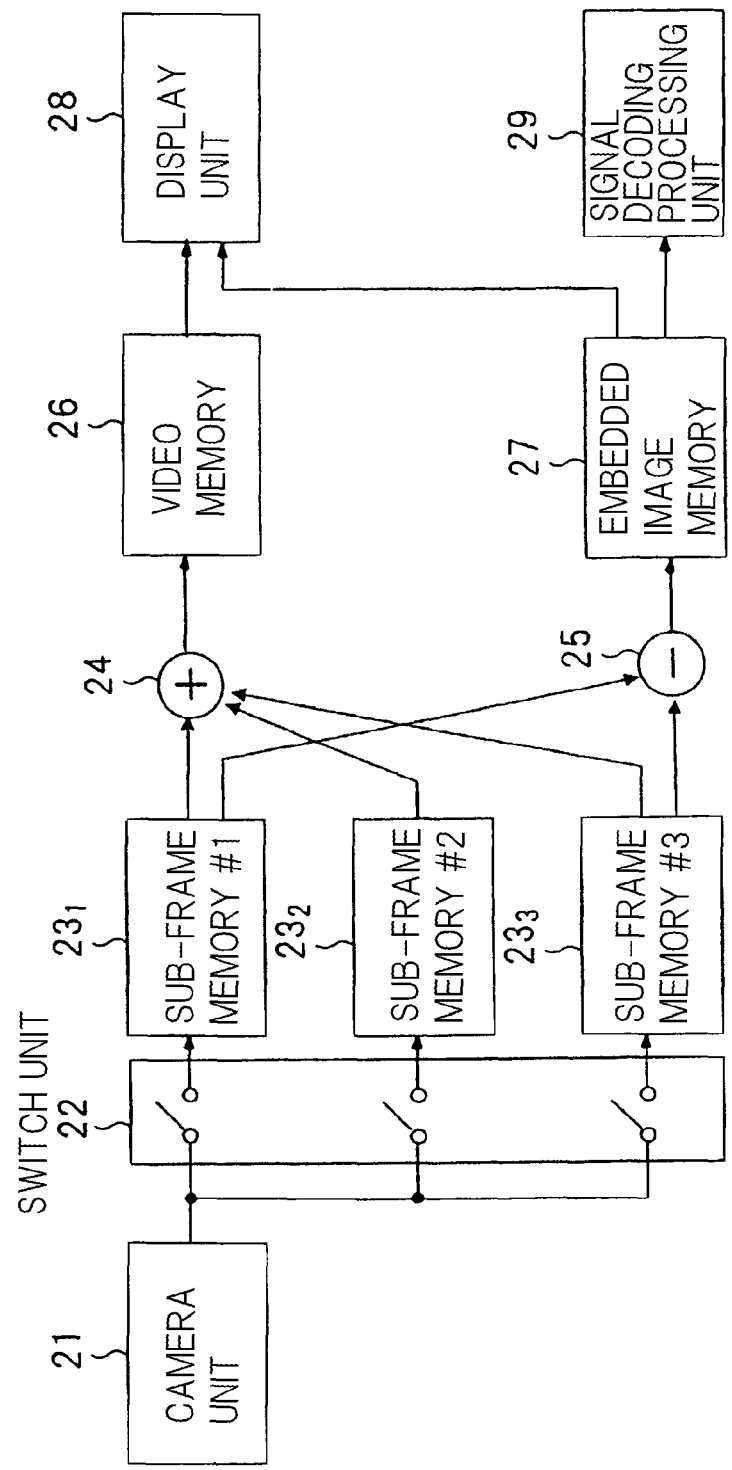
FIG. 3 is a block diagram showing a configuration example of a reception device according to a first exemplary embodiment.

FIG. 2 is a block diagram showing a configuration example of the display device and the control device shown in FIG. 1. FIG. 3 is a block diagram showing the configuration of the reception device according to the first exemplary embodiment.

As shown in FIG. 2, control device 3 includes level modulating unit 11 and signal combining unit 12. Display device 1 includes sub-frame memory unit 13 and display unit 14. The image signal of the basic image (a basic image signal in FIG. 2) and the image signals of the embedded image (an embedded image signal in FIG. 2) may be input from a not-shown electronic apparatus provided on the outside to control device 3 or may be generated in the inside of control device 3.

Level modulating unit 11 generates the image signal of the embedded image for each of the sub-frames that are superimposed on the image signal of the basic image in the sub-frames. Level modulating unit 11 in this exemplary embodiment generates, for example, the image signal in the positive direction of the embedded image superimposed in the second sub-frame and the image signal in the negative direction superimposed in the third sub-frame.

Signal combining unit 12 superimposes, for each of the sub-frames, the image signal of the embedded image on the image signal of the basic image and outputs the image signal to sub-frame memory unit 13.

Sub-frame memory unit 13 stores, as image data, the image signal for each of the sub-frames output from signal combining unit 12. Sub-frame memory unit 13 may be included in control device 3 rather than display device 1.

Display unit 14 displays an image for each of the sub-frames according to the image signal stored in sub-frame memory unit 13.

Control device 3 can be realized by an A/D converter for processing an image signal and a CPU, a DSP, a logical operation circuit, or the like that executes processing according to a program. As display device 1, a liquid crystal display, an LED display, a projector device of a DLP type, an organic EL display, a PDP, or the like can be used.

As shown in FIG. 3, reception device 2 includes camera unit 21, switch unit 22, sub-frame memories (#1 to #3) $23_1$ to $23_3$, adder 24, subtracter 25, video memory 26, embedded image memory 27, display unit 28, and signal decoding processing unit 29.

Camera unit 21 shoots an image displayed on display unit 14 of display device 1 in each period same as the display period of the sub-frame. Camera unit 21 has a configuration set in advance such that a shooting period is the same as the display period of the sub-frame of display device 1 or a configuration that can be set or selected according to operation by the user such that a shooting period is the same as the display period of the sub-frame of display device 1.

Switch unit 22 sequentially allocates image signals output from camera unit 21 to three sub-frame memories $23_1$ to $23_3$ in each period that is the same as the period of the sub-frame.

Sub-frame memories $23_1$ to $23_3$ store, as image data, image signals output from switch unit 22.

Adder 24 adds up the image signals stored in sub-frame memories $23_1$ to $23_3$ and outputs an added-up image signal to video memory 26.

Subtracter 25 subtracts the image signal stored in, for example, sub-frame memory (#3) $23_3$ from the image signal stored in sub-frame memory (#1) $23_1$ and outputs an image signal obtained by the subtraction to embedded image memory 27.

Video memory 26 stores image data of a basic image output from adder 24.

Embedded image memory 27 stores image data of the embedded image output from subtracter 25.

Display unit 28 displays, according to operation by the user, the basic image or the embedded image using the image data stored in video memory 26 or embedded image memory 27.

Signal decoding processing unit 29 executes predetermined signal processing on the image data of the embedded image output from subtracter 25. For example, when the embedded image is a two-dimensional code, signal decoding processing unit 29 decodes the two-dimensional code.

As reception device 2, a portable terminal device such as a cellular phone, a PDA (Personal Digital Assistant), or a personal computer of a notebook type including camera unit 21 that shoots an image in a period which is the same as the display period of the sub-frames of display device 1 is used.

Figure 4:
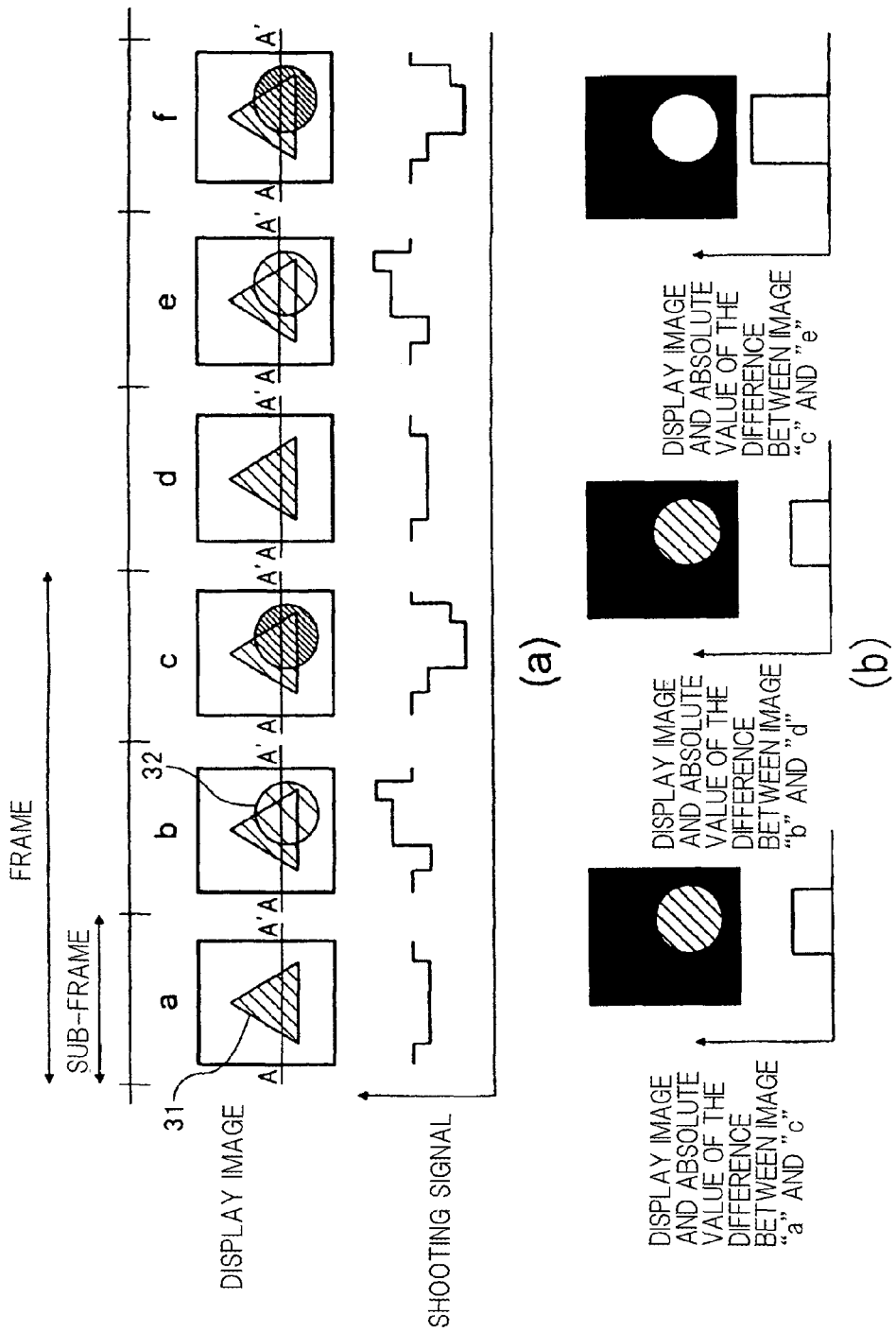
FIG. 4 is a schematic diagram showing an operation example of a communication system according to the first exemplary embodiment.
Figure 5:
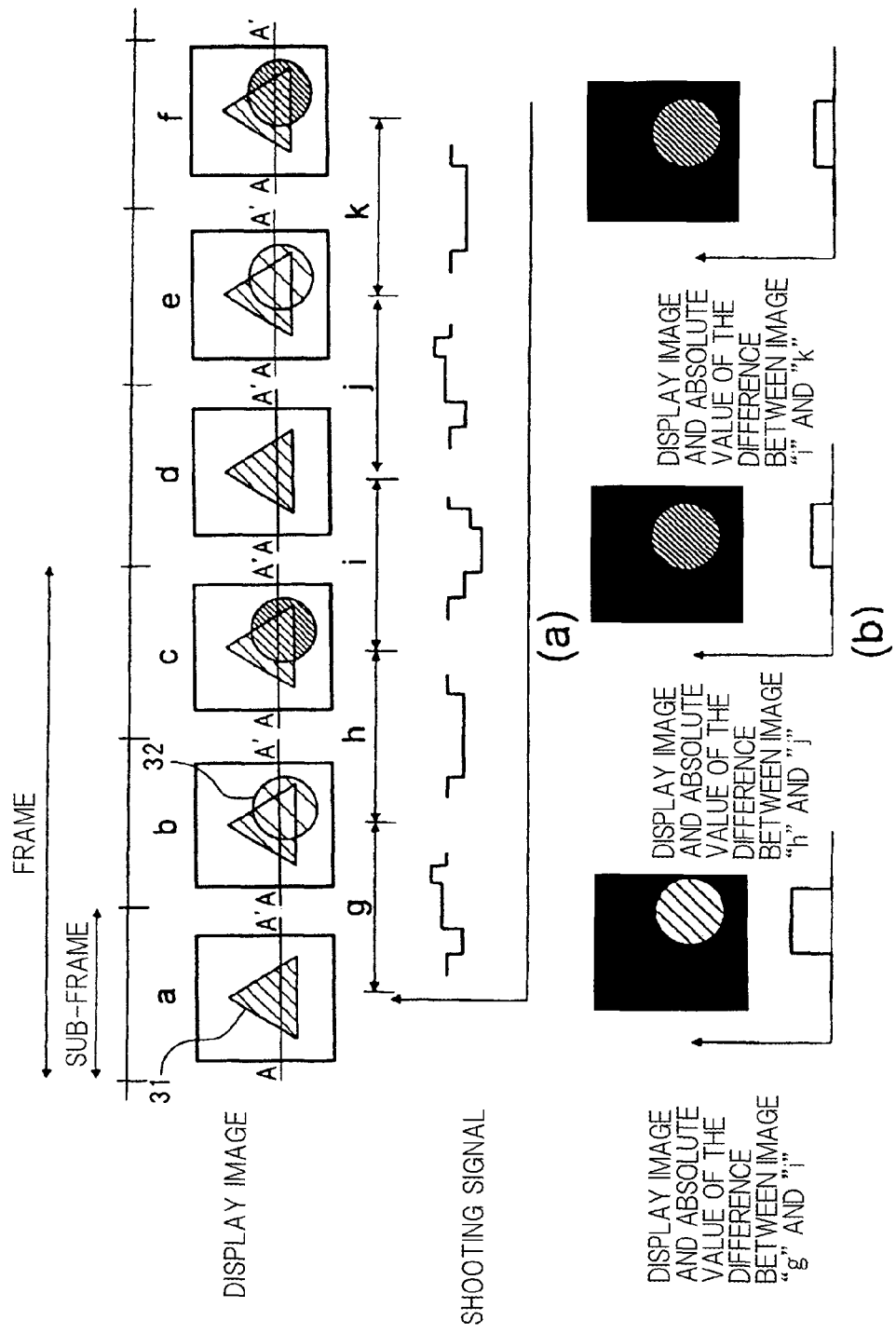
FIG. 5 is a schematic diagram showing an operation example of the communication system according to the first exemplary embodiment.

FIG. 4 and FIG. 5 are schematic diagrams showing operation examples of the communication system according to the first exemplary embodiment. FIG. 4 and FIG. 5 show an example in which basic image 31 of a triangular shape and embedded image 32 of a circular shape are displayed.

As explained above, control device 3 divides one frame into three sub-frames and causes display device 1 to display a basic image in a first sub-frame, superimposes image signals of an embedded image on the image signal of the basic image in a positive direction and causes display device 1 to display the embedded image in a second sub-frame, and superimposes the image signals of the embedded image on the image signal of the basic image in a negative direction and causes display device 1 to display the embedded image in a third sub-frame. In this case, the user who looks at the display image on display device 1 perceives only the basic image because the embedded image in the positive direction displayed in the second sub-frame and the embedded image in the negative direction displayed in the third sub-frame are offset. Since this basic image is repeatedly displayed for each of frames, a user who looks at display device 1 without using the optical shutter does not perceive flicker in the basic image.

On the other hand, reception device 2 according to the first exemplary embodiment shoots, according to an operation by the user, with camera unit 21, an image displayed on display device 1 in each period which is the same as the display period of the sub-frames of display device 1.

In general, as camera unit 21 included in the portable terminal device uses as reception device 2, an imaging device such as a CCD (Charge Coupled Device) or a CMOS is used. Usually, in order to reduce noise and improve light reception sensitivity, camera unit 21 employing the imaging device operates in an accumulation mode for integrating, according to the light reception amount, charges generated in the CCD or the CMOS for a fixed period (e.g., a period of one sub-frame).

Reception device 2 according to this exemplary embodiment does not have a configuration for receiving, from display device 1, a synchronization signal that synchronizes with the frame and the sub-frames. Therefore, the integration period (the period corresponding to one sub-frame) of camera unit 21 and sub-frames displayed on display device 1 do not always synchronize with each other. However, in this exemplary embodiment, the integration period of camera unit 21 and the display period of the sub-frames of display device 1 are the same. Display device 1 repeatedly displays the frame including the same sub-frames. Therefore, even if the integration period of camera unit 21 and the sub-frames displayed on display device 1 do not synchronize with each other, information concerning the basic image and the embedded image is included in image signals obtained in each shooting period. Therefore, if image signals that correspond to the first sub-frame, image signals that correspond to the second sub-frame and image signals that correspond to the third sub-frame shot by camera unit 21 are added up, the image signals of the embedded image included in the second sub-frame and the third sub-frame are offset and the remaining image signals of the basic image are obtained. If the difference between the image signals corresponding to the first sub-frame and the third sub-frame is calculated, the image signals of the basic image included in the first sub-frame and the third sub-frame are offset and the remaining image signals of the embedded image are obtained.

FIG. 4(a) shows an example of a display image of display device 1 and an image signal (a shooting signal) output from camera unit 21 at the time when the integration period of camera unit 21 and the sub-frames displayed on display device 1 synchronize with each other. FIG. 4(b) shows an example of an embedded image and an image signal of the embedded image output from subtracter 25 of reception device 2 at the time when the integration period of camera unit 21 and the sub-frames displayed on display device 1 synchronize with each other. FIG. 4(b) shows an image (an embedded image) of the difference between image signals corresponding to an image "a" (an integrated value in a period "a") and an image "c" (an integrated value in a period "c") shown in FIG. 4(a) and an absolute value of the difference, an image (an embedded image) of the difference between image signals corresponding to an image "b" (an integrated value in a period "b") and an image "d" (an integrated value in a period "d") and an absolute value of the difference, and an image (an embedded image) of the difference between image signals corresponding to the image "c" (the integrated value in the period "c") and an image "e" (an integrated value in a period "e") and an absolute value of the difference. An imaging signal shown in FIG. 4(a) indicates a signal level corresponding to A-A' line of a display image shown in FIG. 4(a). The image signal shown in FIG. 4(b) indicates a signal level corresponding to A-A' line of the display image shown in FIG. 4(a).

FIG. 5(a) shows an example of a display image of display device 1 and an image signal (a shooting signal) output from camera unit 21 at the time when the integration period of camera unit 21 is delayed by a ½ period with respect to the sub-frames displayed on display device 1. FIG. 5(b) shows an example of an embedded image and image signals of the embedded image output from subtracter 25 of reception device 2 at the time when the integration period of camera unit 21 is delayed by a ½ period with respect to the sub-frames displayed on display device 1. FIG. 5(b) shows an image (an embedded image) of the difference between image signals corresponding to an image "g" (an integrated value in a period "g") and an image "i" (an integrated value in a period "i") shown in FIG. 5(a) and an absolute value of the difference, an image (an embedded image) of the difference between image signals corresponding to an image "h" (an integrated value in a period "h") and an image "j" (an integrated value in a period "j") and an absolute value of the difference, and an image (an embedded image) of the difference between image signals corresponding to the image "i" (the integrated value in the period "i") and an image "k" (an integrated value in a period "k") and an absolute value of the difference. An imaging signal shown in FIG. 5(a) indicates a signal level corresponding to A-A' line of a display image shown in FIG. 5(a). The image signal shown in FIG. 5(b) indicates a signal level corresponding to A-A' line of the display image shown in FIG. 5(a).

As is seen when FIG. 4(a) and FIG. 5(a) are compared, when the integration period of camera unit 21 deviates with respect to the sub-frames displayed on display device 1, even if an image for each of the sub-frames displayed on display device 1 is the same, the waveform of an image signal output from camera unit 21 in each of shooting periods is different. However, these image signals obtained in each period which is the same as the period of the sub-frames are different only in signal levels. Information concerning the basic image and the embedded image is included in both the image signals.

Therefore, irrespective of whether the integration period of camera unit 21 and the sub-frames displayed on display device 1 synchronize with each other, as shown in FIG. 4(b) and FIG. 5(b), if the difference between the image signals corresponding to the first sub-frame and the third sub-frame is calculated, the image signals of the basic image included in the first sub-frame and the third sub-frame are offset and the remaining image signals of the embedded image are obtained. If the image signals corresponding to the first sub-frame to the third sub-frame are added up, the image signals of the embedded image included in the second sub-frame and the third sub-frame are offset and the remaining image signals of the basic image are obtained.

Therefore, with the communication system according to this exemplary embodiment, it is possible to perform visible light communication with simple means without spoiling the appearance of a public image and without using a synchronization signal or the like.

Second Exemplary Embodiment

In a second exemplary embodiment, one frame is divided into, for example, three sub-frames and image signals of an embedded image are distributed and superimposed in all the divided sub-frames. Specifically, in control device 3 according to the second exemplary embodiment, when an image signal of an embedded image superimposed on a basic image in a first sub-frame is represented as X, an image signal of an embedded image superimposed on the basic image in a second sub-frame is represented as Y, and an image signal of the embedded image superimposed on the basic image in the third sub-frame is represented as Z, signal levels of the embedded image in the sub-frames are set such that the following Formula (1) holds.

$$X+Y+Z=0 \quad (1)$$

where
[Numeral 1]
$|X| \neq |Y|, |Y| \neq |Z|, |Z| \neq |X|$

In this way, even if the signal levels of the embedded image superimposed in the sub-frames in the same frame are different from one another and the image signals of the embedded image are distributed to the sub-frames such that a sum of the signal levels of the embedded image superimposed in the sub-frames is zero, as in the first exemplary embodiment, the embedded images displayed in the sub-frames are offset and a user who looks at display device 1 perceives only the basic image.

On the other hand, as in the first exemplary embodiment, reception device 2 according to the second exemplary embodiment shoots, using camera unit 21, an image displayed on display device 1 in each period which is the same as a period of the sub-frames. At this point, as in the first exemplary embodiment, if image signals that correspond to the first sub-frame, image signals that correspond to the second sub-frame and image signals that correspond to the third sub-frame shot by camera unit 21 are added up, the image signals of the embedded image included in the sub-frames are offset and the remaining image signals of the basic image are obtained. If the difference between two image signals among the image signals corresponding to the first sub-frame to the third sub-frame is calculated, the image signals of the basic image included in the sub-frames are offset and the remaining image signals of the embedded image are obtained.

Control device 3 according to this exemplary embodiment generates image signals of the embedded image having signal levels X, Y, and Z superimposed on the basic image in the sub-frames by level modulating unit 11 shown in FIG. 2. Signal combining unit 12 superimposes the image signals of the embedded image having signal levels X, Y, and Z on the image signal of the basic image for each of the sub-frames and outputs the embedded image to sub-frame memory unit 13. Since other components and operations are the same as those of control device 3 according to the first exemplary embodiment, explanation of the components and the operations is omitted. Since components and operations of display device 1 are the same as those of the display device according to the first exemplary embodiment, explanation of the components and the operations is omitted.

Reception device 2 according to the second exemplary embodiment can be realized by changing the connection between subtracter 25 and sub-frame memories $23_1$ to $23_3$ shown in FIG. 3. Specifically, image signals stored in sub-frame memory (#1) $23_1$ and sub-frame memory (#2) $23_2$ only have to be output to subtracter 25 and subtracter 25 only has to subtract, for example, an image signal stored in sub-frame memory (#2) $23_2$ from an image signal stored in sub-frame memory (#1) $23_1$ and output an image signal obtained by the subtraction to embedded image memory 27.

Figure 6:
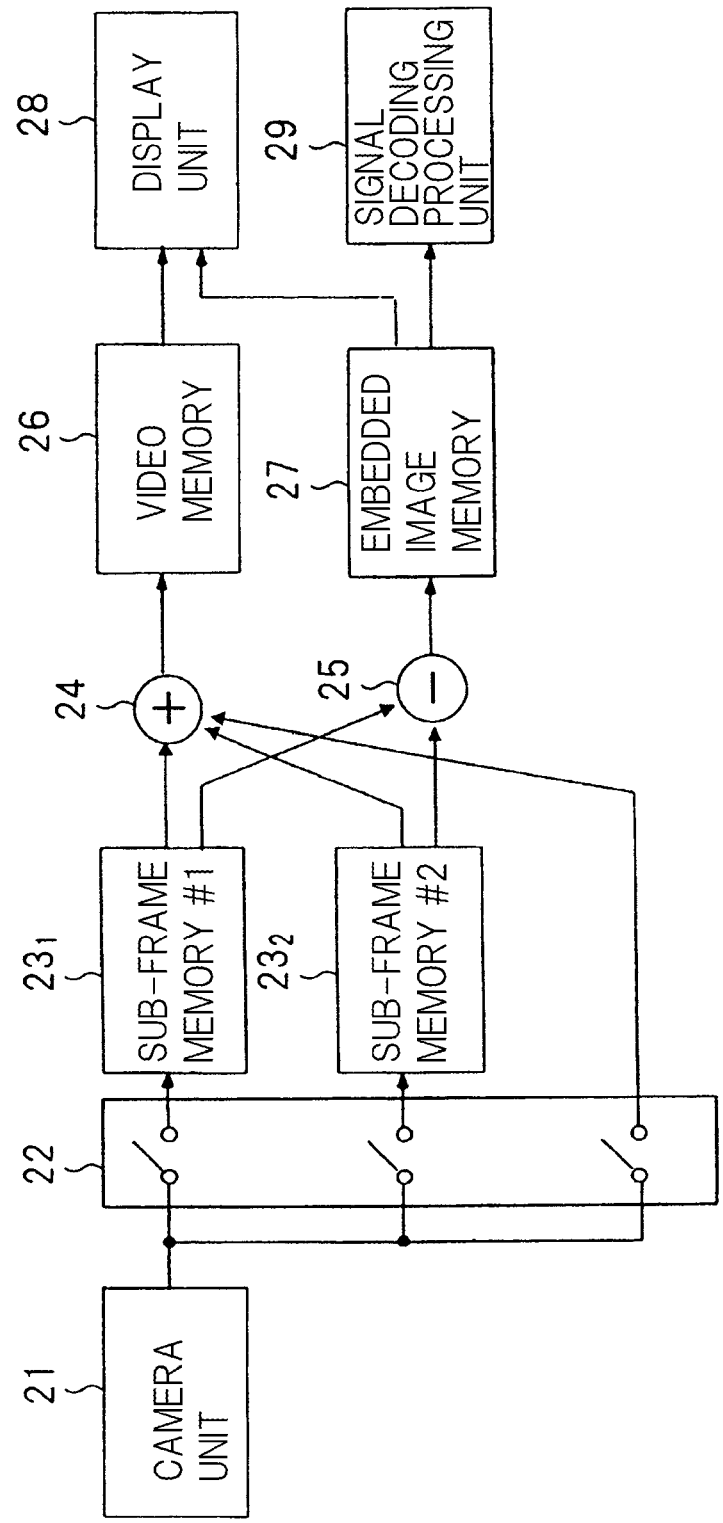
FIG. 6 is a block diagram showing another configuration example of a reception device according to a second exemplary embodiment.

Reception device 2 according to the second exemplary embodiment can also be realized by a configuration for directly outputting an image signal corresponding to the third sub-frame, which is output from switch unit 22, to adder 24 without storing the image signal in sub-frame memory 23 as shown in FIG. 6.

In reception device 2 shown in FIG. 6, since the number of sub-frame memories 23 can be reduced compared with the configuration shown in FIG. 3, it is possible to reduce the cost of reception device 2. Since other components and operations are the same as those of reception device 2 shown in FIG. 3, explanation of the components and the operations is omitted.

Figure 7:
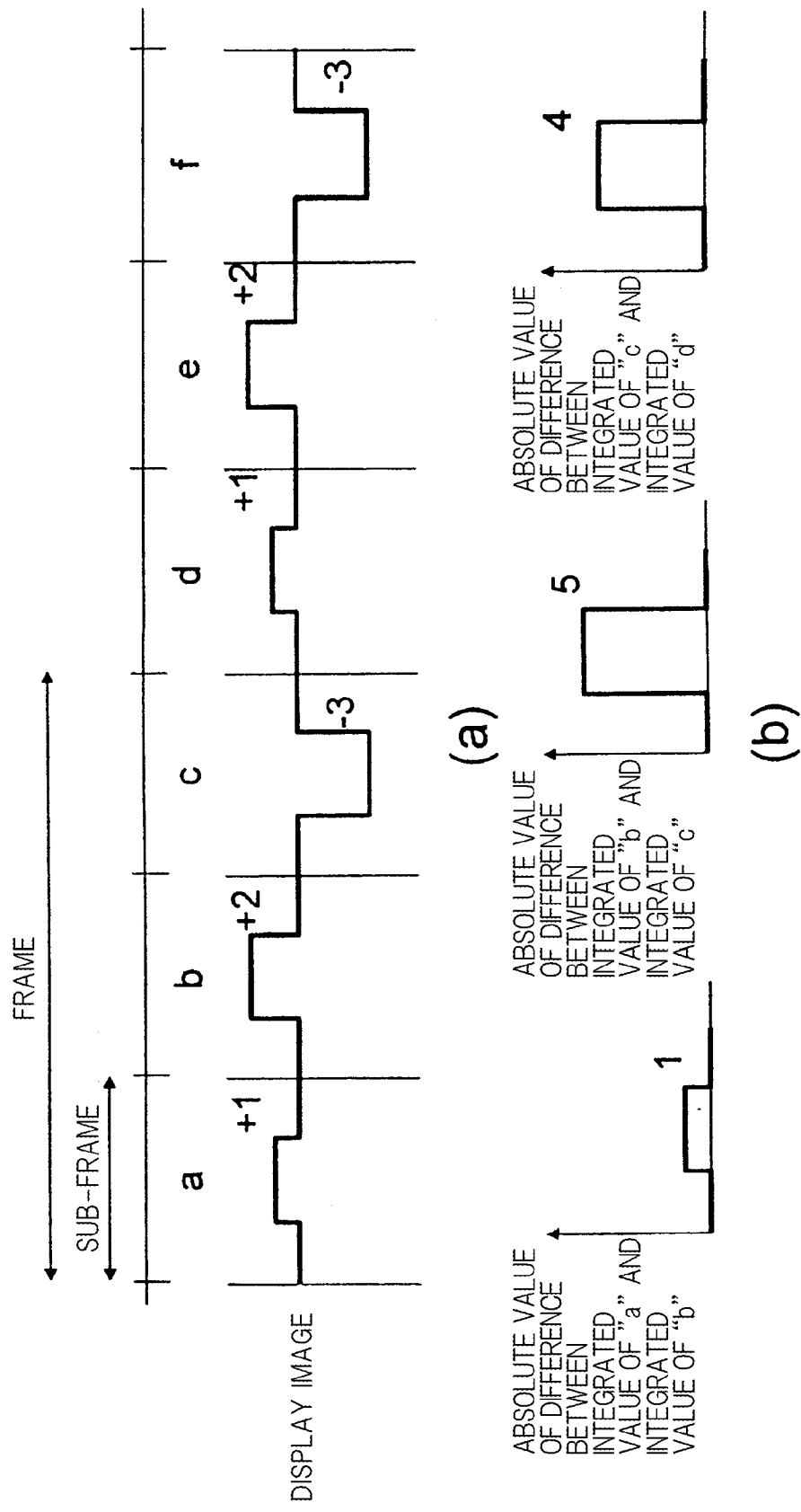
FIG. 7 is a schematic diagram showing an operation example of a communication system according to the second exemplary embodiment.

FIG. 7(a) shows an example of an image signal (a display signal) of display device 1 at the time when the integration period of camera unit 21 and the sub-frames displayed on display device 1 synchronize with each other. FIG. 7(b) shows an example of an image signal output from subtracter 25 of reception device 2 at the time when the integration period of camera unit 21 and the sub-frames displayed on display device 1 synchronize with each other. FIG. 7(b) shows an absolute value of the difference between an image signal "a" (an integrated value in a period "a") and an image signal "b" (an integrated value in a period "b") shown in FIG. 7(a), an absolute value of the difference between the image signal "b" (the integrated value in the period "b") and an image signal "c" (an integrated value in a period "c"), and an absolute value of the difference between the image signal "c" (the integrated value in the period "c") and an image signal "d" (an integrated value in a period "d").

Figure 8:
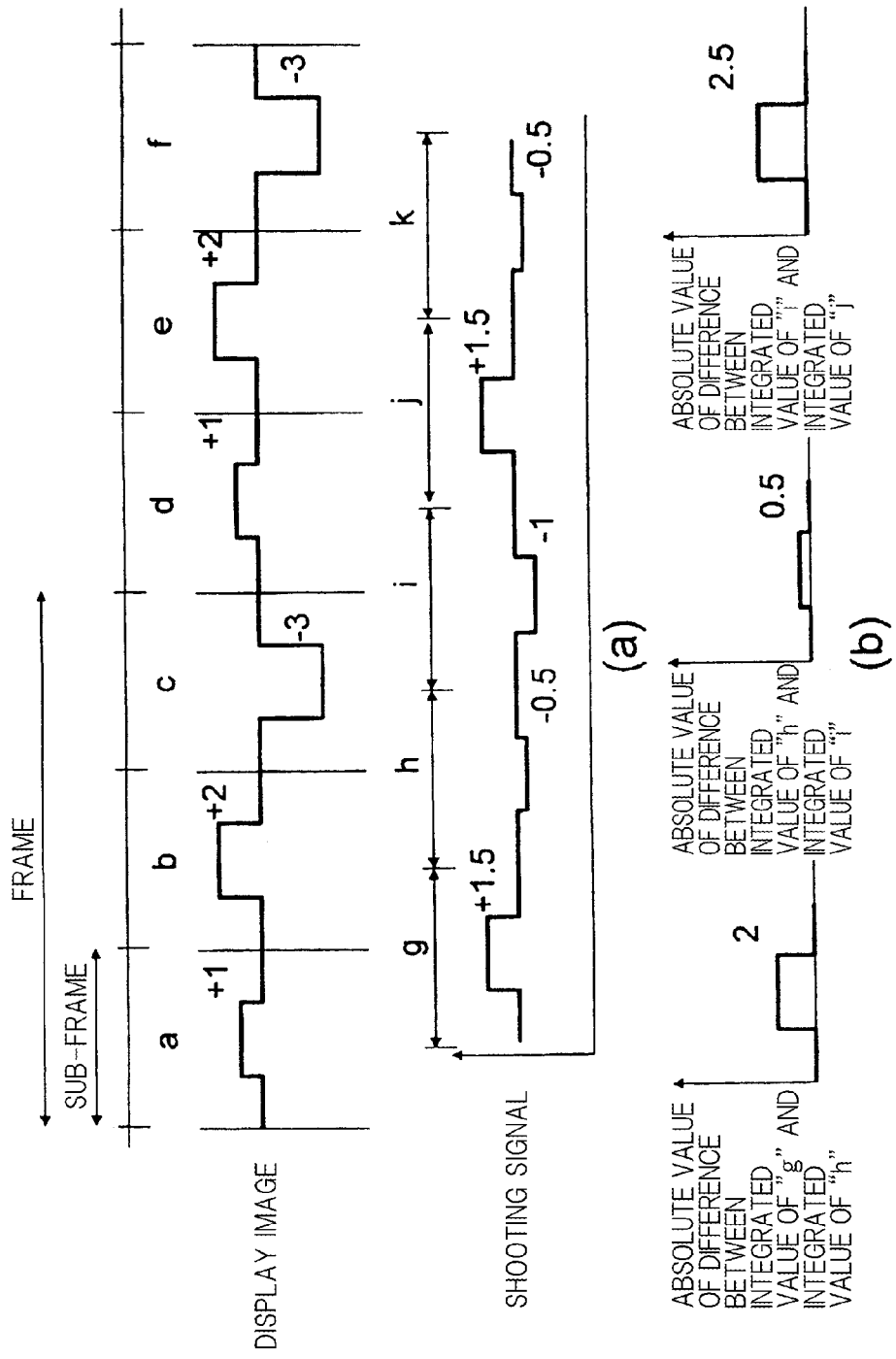
FIG. 8 is a schematic diagram showing an operation example of the communication system according to the second exemplary embodiment.

FIG. 8(a) shows an example of an image signal (a display signal) of display device 1 and an image signal (a shooting signal) output from camera unit 21 of reception device 2 at the time when the integration period of camera unit 21 is delayed by a ½ period with respect to the sub-frames displayed on display device 1. FIG. 8(b) shows an example of an image signal output from subtracter 25 of reception device 2 at the time when the integration period of camera unit 21 is delayed by a ½ period with respect to the sub-frames displayed on display device 1. FIG. 8(b) shows an absolute value of the difference between an image signal "g" (an integrated value in a period "g") and an image signal "h" (an integrated value in a period "h") shown in FIG. 8(a), an absolute value of the difference between the image signal "h" (the integrated value in the period "h") and an image signal "i" (an integrated value in a period "i"), and an absolute value of the difference between the image signal "i" (the integrated value in the period "i") and an image signal "j" (an integrated value in a period "j").

As shown in FIG. 7(b) and FIG. 8(b), in reception device 2 according to the second exemplary embodiment, as in the first exemplary embodiment, irrespective of whether the integration period of camera unit 21 and the sub-frames displayed on display device 1 synchronize with each other, if the difference between the image signals corresponding to the first sub-frame and the third sub-frame is calculated, the image signals of the embedded image are obtained. If the image signals corresponding to the first sub-frame to the third sub-frame are added up, the basic image is obtained.

Therefore, according to the second exemplary embodiment, as in the first exemplary embodiment, it is possible to perform visible light communication with simple means without spoiling the appearance of a public image and without using a synchronization signal or the like. In reception device 2 according to the second exemplary embodiment, if the configuration shown in FIG. 6 is adopted, it is possible to reduce the number of sub-frame memories 23. Therefore, it is possible to reduce the cost of reception device 2 compared with the first exemplary embodiment.

Third Exemplary Embodiment

A third exemplary embodiment adopts a configuration for dividing one frame into three sub-frames and outputting an image signal obtained by distributing image signals of an embedded image to all the divided sub-frames and superimposing the image signals. Since components and operations of control device 3 according to the third exemplary embodiment are the same as those of control device 3 according to the second exemplary embodiment, explanation of the components and the operations is omitted. Since components and operations of display device 1 are also the same as those of display device 1 according to the second exemplary embodiment, explanation of the components and the operations is omitted.

Reception device 2 according to the third exemplary embodiment shoots, with camera unit 21 included in reception device 2, an image displayed on display device 1 in each period which is the same as the period of the sub-frames. At this point, reception device 2 according to the third exemplary embodiment continuously integrates the first sub-frame and the second sub-frame and adds up image signals of the two sub-frames. An embedded image is acquired by calculating the difference between signal levels of an image signal (an integrated signal) obtained by adding up the image signals of the first sub-frame and the second sub-frame and an image signal of the third sub-frame. A basic image is acquired by adding up the integrated signal of the first sub-frame and the second sub-frame and the image signal of the third sub-frame.

Figure 9:
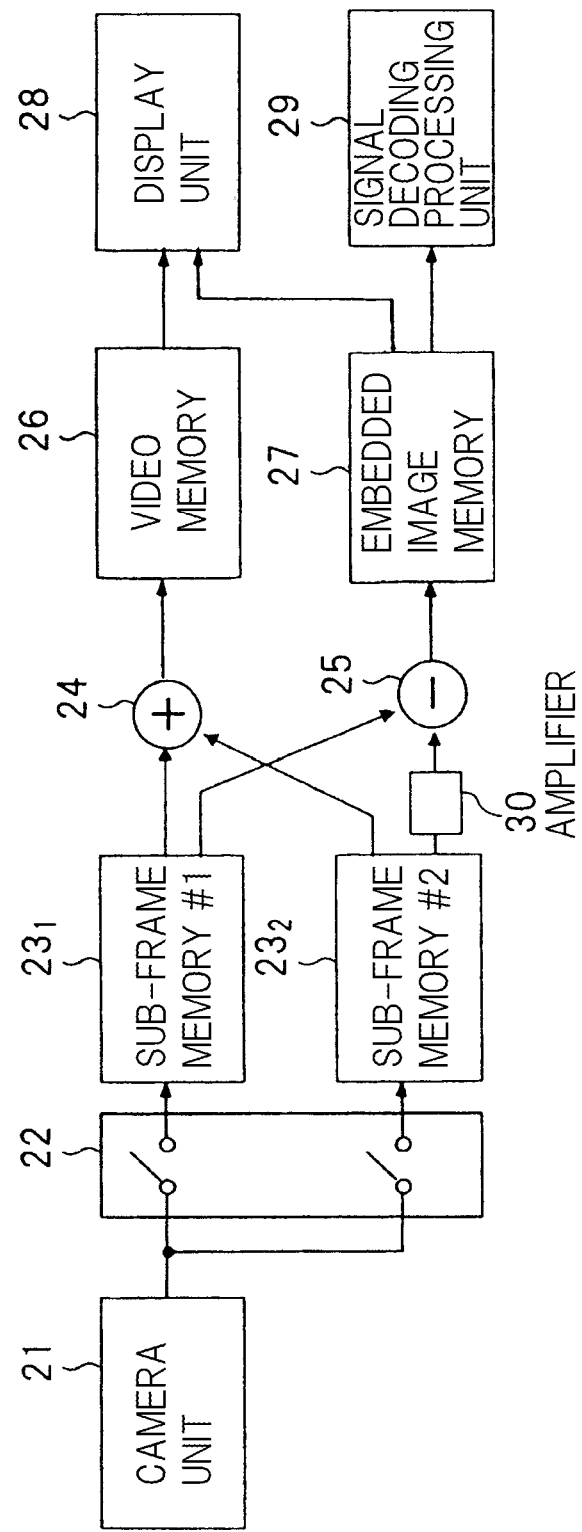
FIG. 9 is a block diagram showing a configuration example of a reception device according to a third exemplary embodiment.

FIG. 9 is a block diagram showing a configuration example of a reception device according to the third exemplary embodiment.

As shown in FIG. 9, reception device 2 according to the third exemplary embodiment includes camera unit 21, switch unit 22, sub-frame memory (#1) $23_1$, sub-frame memory (#2) $23_2$, amplifier 30, adder 24, subtracter 25, video memory 26, embedded image memory 27, display unit 28, and signal decoding processing unit 29.

Camera unit 21 according to the third exemplary embodiment continuously integrates the first sub-frame and the second sub-frame and acquires an image signal (an integrated signal) obtained by adding up image signals of the first sub-frame and the second sub-frame and an image signal of the third sub-frame.

Switch unit 22 allocates the integrated signal of the first sub-frame and the second sub-frame, which is output from camera unit 21, to sub-frame memory (#1) $23_1$ and allocates the image signal of the third sub-frame to sub-frame memory (#2) $23_2$.

Sub-frame memory (#1) $23_1$ and sub-frame memory (#2) $23_2$ store, as image data, the image signals output from switch unit 22.

Adder 24 adds up the image signal stored in sub-frame memory (#1) $23_1$ and the image signal stored in sub-frame memory (#2) $23_2$ and outputs an added-up image signal to video memory 26.

Amplifier 30 doubles a signal level of the image signal stored in sub-frame memory (#2) $23_2$ and outputs the image signal to subtracter 25.

Subtracter 25 subtracts the output signal of amplifier 30 from the image signal stored in sub-frame memory (#1) $23_1$ and outputs an image signal obtained by the subtraction to embedded image memory 27. Since other components and operations are the same as those of reception device 2 according to the first exemplary embodiment, explanation of the components and the operations is omitted.

Figure 10:
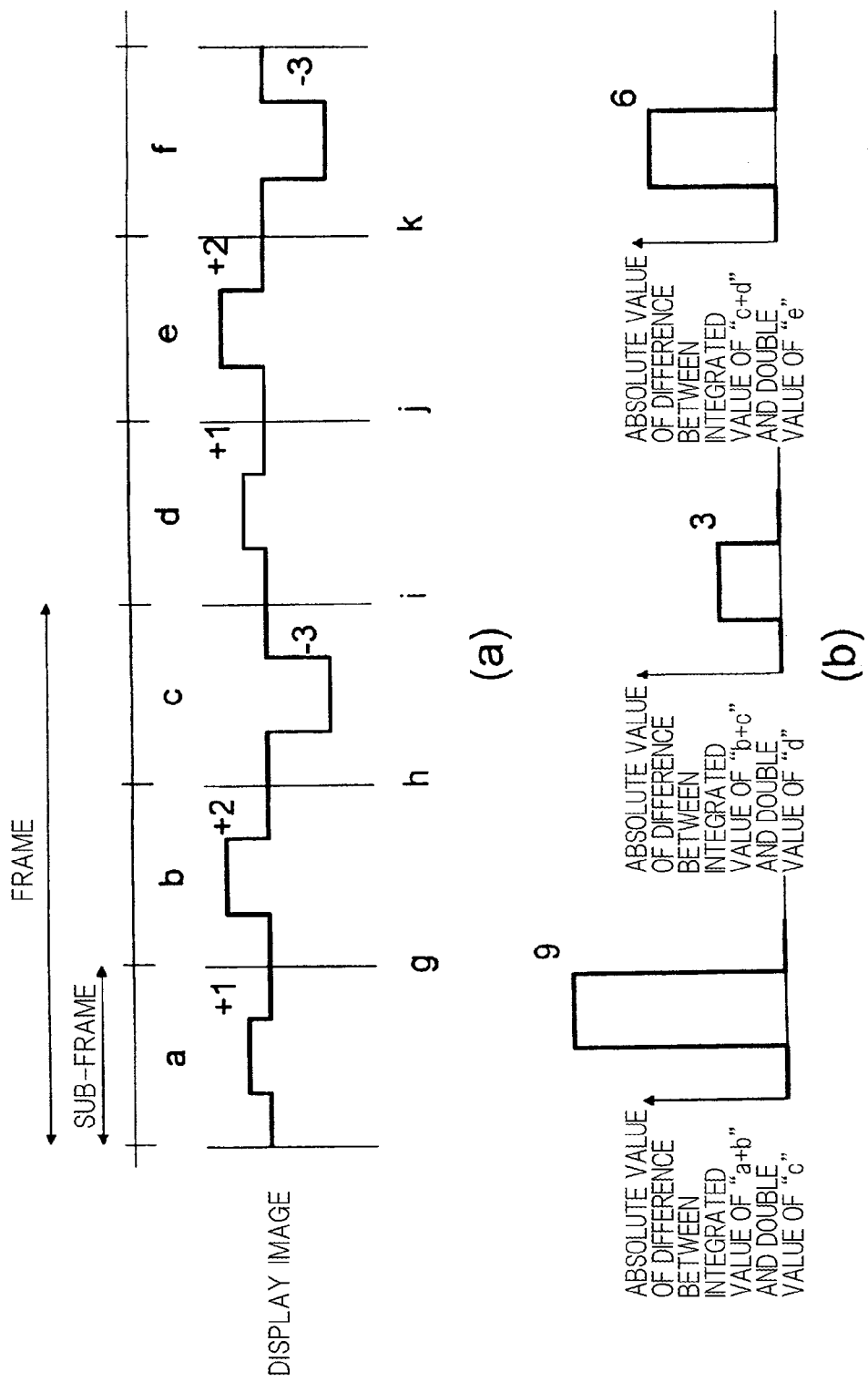
FIG. 10 is a schematic diagram showing an operation example of a communication system according to the third exemplary embodiment

FIG. 10(a) shows an example of an image signal (a display signal) of display device 1 at the time when the integration period of camera unit 21 and the sub-frames displayed on display device 1 synchronize with each other. FIG. 10(b) shows an example of an image signal output from subtracter 25 of reception device 2 at the time when the integration period of camera unit 21 and the sub-frames displayed on display device 1 synchronize with each other. FIG. 10(b) shows an absolute value of the difference between an integrated value of image signals "a" and "b" (an integrated value in a period a+b) and a double value of an image signal "c" (an integrated value in a period "c") shown in FIG. 10(a), an absolute value of the difference between an integrated value of the image signals "b" and "c" (an integrated value in a period b+c) and a double value of an image signal "d" (an integrated value in a period "d"), and an absolute value of the difference between an integrated value of the image signals "c" and "d" (an integrated value in a period c+d) and a double value of an image signal "e" (an integrated value in a period "e").

Figure 11:
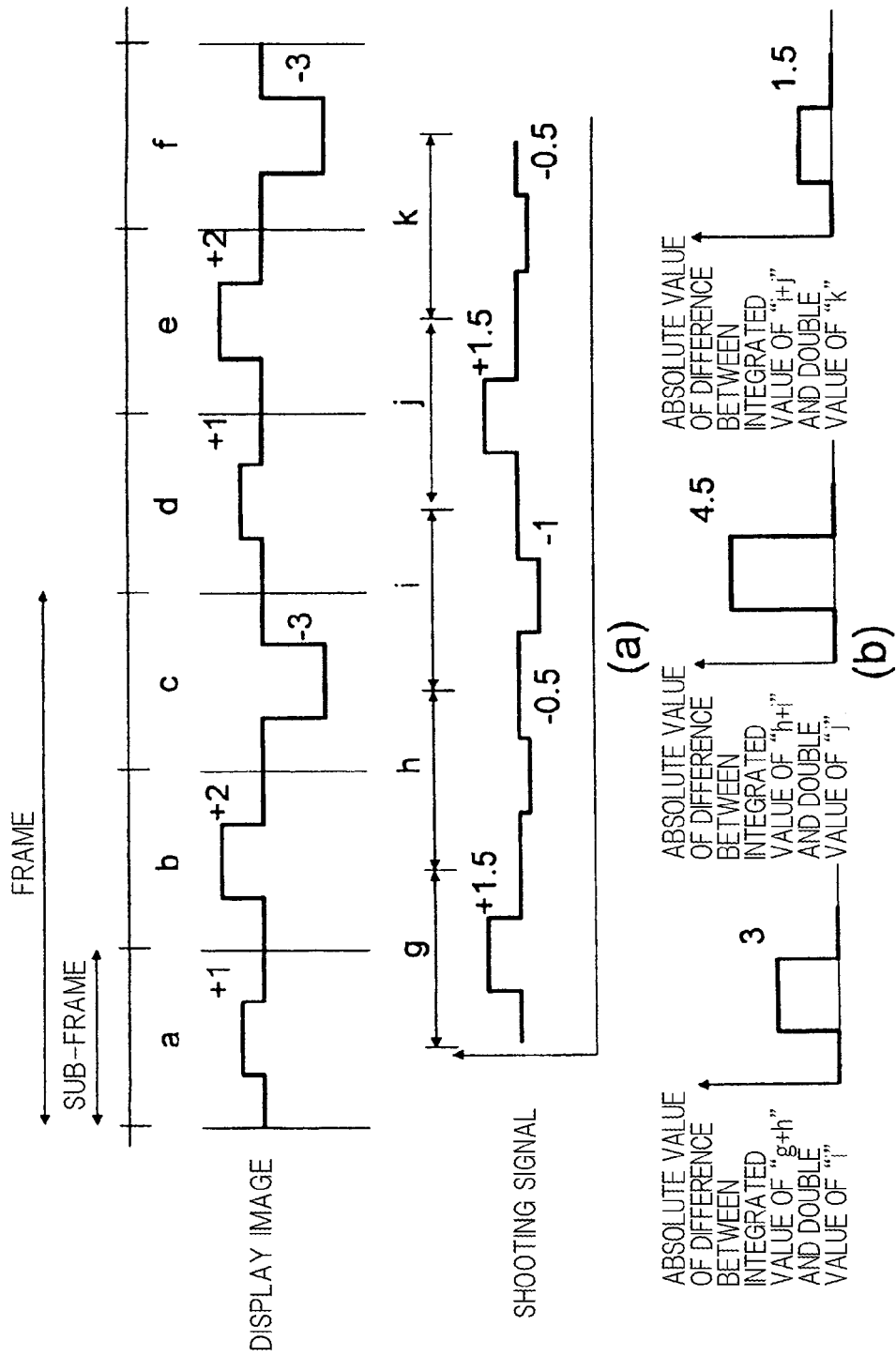
FIG. 11 is a schematic diagram showing an operation example of the communication system according to the third exemplary embodiment.

FIG. 11(a) shows an example of an image signal (a display signal) of display device 1 and an image signal (a shooting signal) output from camera unit 21 of reception device 2 at the time when the integration period of camera unit 21 is delayed by a ½ period with respect to the sub-frames displayed on display device 1. FIG. 11(b) shows an example of an image signal output from subtracter 25 of reception device 2 at the time when the integration period of camera unit 21 is delayed by a ½ period with respect to the sub-frames displayed on display device 1. FIG. 11(b) shows an absolute value of the difference between an integrated value of image signals "g" and "h" (an integrated value in a period g+h) and a double value of an image signal "i" (an integrated value in a period "i") shown in FIG. 11(a), an absolute value of the difference between an integrated value of the image signals "h" and "i" (an integrated value in a period h+i) and a double value of an image signal "j" (an integrated value in a period "j"), and an absolute value of the difference between an integrated value of the image signals "i" and "j" (an integrated value in a period i+j) and a double value of an image signal "k" (an integrated value in a period "k").

As shown in FIG. 10(b) and FIG. 11(b), in reception device 2 according to the third exemplary embodiment, as in the first and second exemplary embodiments, irrespective of whether the integration period of camera unit 21 and the sub-frames displayed on display device 1 synchronize with each other, if the difference between an image signal obtained by integrating the first sub-frame and the second sub-frame and an image signal obtained by doubling the signal level of the third sub-frame is calculated, the image signals of the embedded image are obtained. If the image signal obtained by integrating the first sub-frame and the second sub-frame and the image signal corresponding to the third sub-frame are added up, the basic image is obtained.

Figure 12:
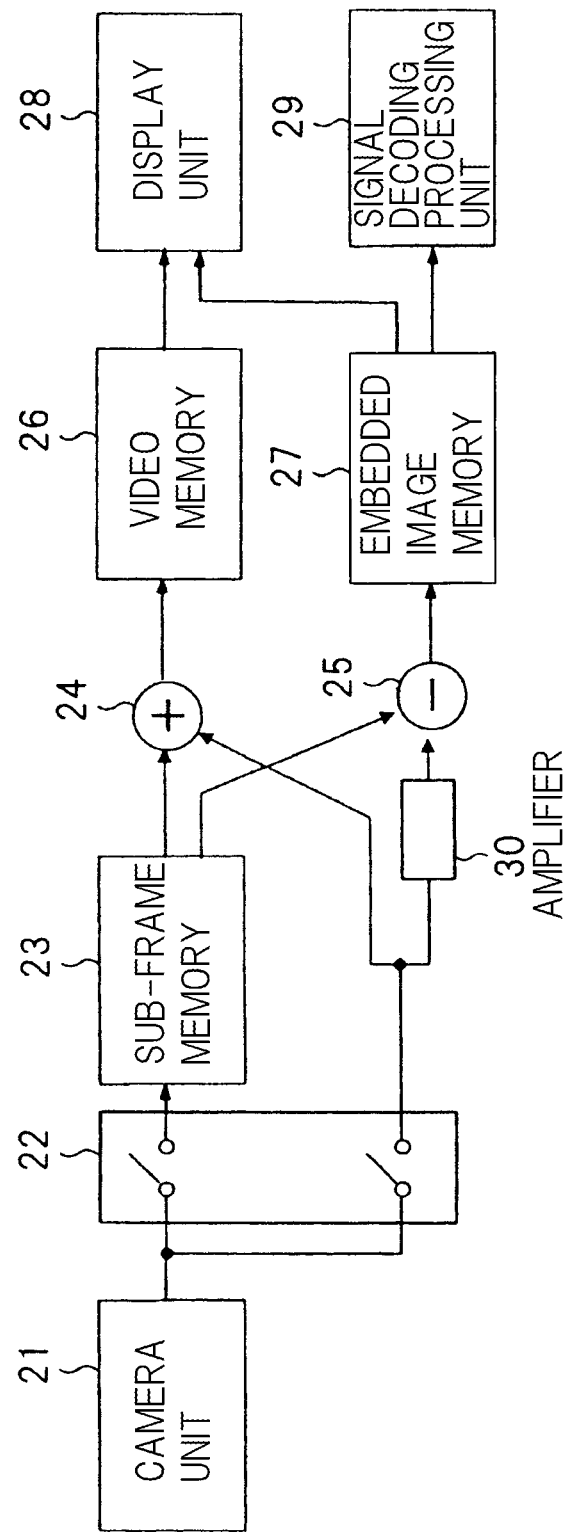
FIG. 12 is a block diagram showing another configuration example of the reception device according to the third exemplary embodiment.

In FIG. 9, a configuration example including sub-frame memory (#1) $23_1$ and sub-frame memory (#2) $23_2$ is shown. As shown in FIG. 12, reception device 2 according to the third exemplary embodiment can also be realized by a configuration obtained by removing sub-frame memory (#2) $23_2$ from the configuration shown in FIG. 9.

In reception device 2 shown in FIG. 12, the image signal corresponding to the third sub-frame output from camera unit 21 is directly supplied to adder 24 and amplifier 30. Such a configuration operates in the same manner as the configuration shown in FIG. 9. If the configuration of reception device 2 shown in FIG. 12 is adopted, it is possible to further reduce the number of sub-frame memories 23 compared with reception device 2 shown in FIG. 9. Therefore, it is possible to further reduce the cost of reception device 2 compared with the first exemplary embodiment and the second exemplary embodiment.

According to the third exemplary embodiment, as in the first and second exemplary embodiments, it is possible to perform visible light communication with simple means without spoiling the appearance of a public image and without using a synchronization signal or the like. As in reception device 2 according to the second exemplary embodiment, it is possible to reduce the number of sub-frame memories 23. Therefore, it is possible to reduce the cost of reception device 2 compared with the first exemplary embodiment.

Further, in the third exemplary embodiment, the difference between the image signal obtained by integrating the first sub-frame and the second sub-frame and the image signal obtained by doubling the signal level of the third sub-frame is calculated to acquire the image signals of the embedded image. Therefore, there is an effect in which a signal level of the embedded image can be increased.

Fourth Exemplary Embodiment

Although an example in which one frame is divided into three sub-frames is explained in the first exemplary embodiment to the third exemplary embodiment, the number of sub-frames in the one frame does not need to be three and can be set to an arbitrary value. However, when the number of sub-frames is increased, display device 1, control device 3, and reception device (portable terminal device) 2 that operate at high speed according to the number are necessary.

Figure 13:
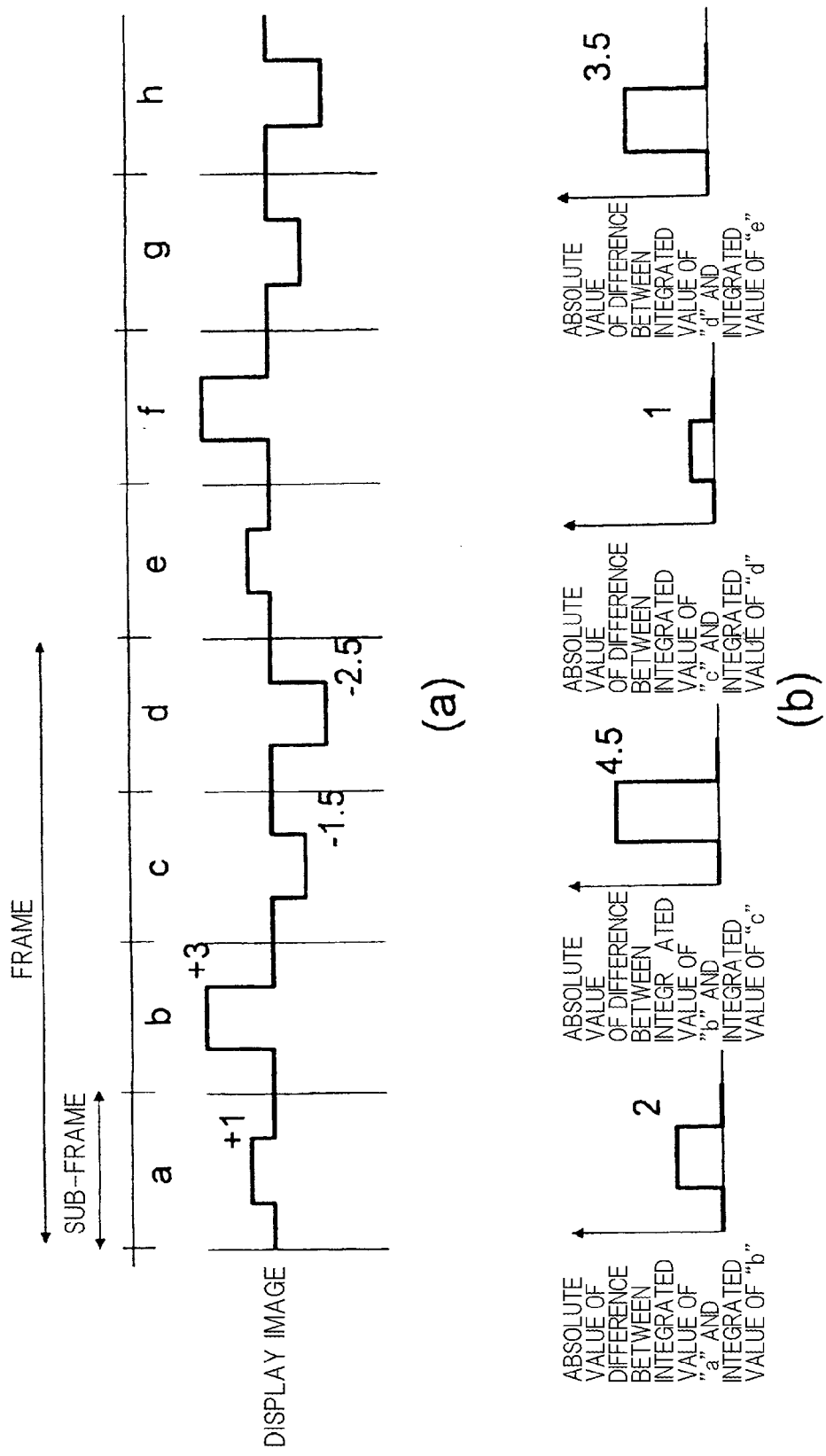
FIG. 13 is a schematic diagram showing an operation example of a communication system according to a fourth exemplary embodiment.

FIG. 13 and FIG. 14 show operation examples of display device 1 and reception device 2 at the time when one frame is divided into four sub-frames. As in the second exemplary embodiment, control device 3 causes display device 1 to display an image obtained by distributing and superimposing image signals of an embedded image in all the sub-frames included in one frame. Since components and operations of control device 3 according to the fourth exemplary embodiment are the same as those of control device 3 according to the second exemplary embodiment, explanation of the components and the operations is omitted. Since components and operations of display device 1 are also the same as those of display device 1 according to the second exemplary embodiment, explanation of the components and the operations is omitted. A frame may include a sub-frame in which only a basic image is displayed as in the first exemplary embodiment.

As reception device 2 according to this exemplary embodiment, the configuration shown in FIG. 3, FIG. 6, FIG. 9, or FIG. 12 can be used. However, in this exemplary embodiment, since one frame is divided into four sub-frames, when the configuration shown in FIG. 3 is adopted, four sub-frame memories (sub-frame memories #1 to #4) 23 for storing image signals corresponding to the sub-frames are necessary. In that case, an image signal of a basic image can be obtained if the image signals stored in the four sub-frame memories 23 are added up. Image signals of an embedded image can be obtained if the difference between image signals stored in any two of sub-frame memories 23 is calculated. The same holds true when the number of sub-frames in one frame is an arbitrary number equal to or larger than four.

When the configuration shown in FIG. 6 is adopted, for example, image signals corresponding to the third sub-frame and the fourth sub-frame only have to be directly output to adder 24 without being stored in sub-frame memories 23. In that case, the image signal of the basic image can be obtained if image signals that correspond to the first sub-frame, image signals that correspond to the second sub-frame, image signals that correspond to the third sub-frame and image signals that correspond to the fourth sub-frame are added up. The image signals of the embedded image can be obtained if the difference between the image signals stored in two sub-frame memories 23 is calculated. The same holds true when the number of sub-frames in one frame is an arbitrary number equal to or larger than four.

When the configuration shown in FIG. 9 is adopted, an integrated signal obtained by adding up image signals of the first sub-frame to the third sub-frame only has to be stored in sub-frame memory (#1) 23$_1$ and an image signal of the fourth sub-frame only has to be stored in sub-frame memory (#2) 23$_2$. In that case, the image signal of the basic image can be obtained by adding up the image signals stored in sub-frame memories 23$_1$ and 23$_2$. The image signals of the embedded image can be obtained if, after a signal level of the image signal stored in sub-frame memory (#2) 23$_2$ is tripled by amplifier 30, the difference between the image signal stored in sub-frame memory (#1) 23$_1$ and the image signal output from amplifier 30 is calculated.

When the configuration shown in FIG. 12 is adopted, the integrated signal of the first sub-frame to the third sub-frame only has to be stored in sub-frame memory 23 and the image signal of the fourth sub-frame only has to be directly output to adder 24 and amplifier 30. In that case, the image signal of the basic image can be obtained if the integrated signal stored in sub-frame memory 23 and the image signal of the fourth sub-frame are added up. The image signals of the embedded image can be obtained if, after the image signal of the fourth sub-frame is tripled by amplifier 30, the difference between the image signal stored in sub-frame memory 23 and the image signal output from amplifier 30 is calculated.

When the configurations shown in FIG. 9 and FIG. 12 are adopted as reception device 2, the configuration explained below only has to be adopted to set the number of sub-frames in one frame to an arbitrary value equal to or larger than four.

When the number of sub-frames in one frame is represented as n (n is a positive integer), an integrated signal obtained by adding up image signals of a first sub-frame to an n−1th sub-frame only has to be stored in sub-frame memory (#1) 23$_1$ (sub-frame memory 23 in the configuration shown in FIG. 12) and an image signal of an nth sub-frame only has to be stored in sub-frame memory (#2) 23$_2$ (in the configuration shown in FIG. 12, the integrated signal and the image signal of the nth sub-frame only has to be directly output to adder 24 and amplifier 30).

In that case, as in the case explained above, the image signal of the basic image can be obtained if the integrated signal and the image signal of the nth sub-frame stored in sub-frame memories 23 are added up. The image signals of the embedded image can be obtained, if the image signal of the nth sub-frame is multiplied by n−1 by amplifier 30, and the difference between the integrated signal stored in sub-frame memory 23 and the image signal output from amplifier 30 is calculated.

FIG. 13(*a*) shows an example of an image signal (a display signal) of display device 1 at the time when the integration period of camera unit 21 and the sub-frames displayed on display device 1 synchronize with each other. FIG. 13(*b*) shows an example of an image signal output from subtracter 25 of reception device 2 at the time when the integration period of camera unit 21 and the sub-frames displayed on display device 1 synchronize with each other. FIG. 13(*b*) shows an absolute value of the difference between an image signal "a" (an integrated value in a period "a") and an image signal "b" (an integrated value in a period "b") shown in FIG. 13(*a*), an absolute value of the difference between the image signal "b" (the integrated value in the period "b") and an image signal "c" (an integrated value in a period "c"), an absolute value of the difference between the image signal "c" (the integrated value in the period "c") and an image signal "d" (an integrated value in a period "d"), and an absolute value of the difference between the image signal "d" (the integrated value in the period "d") and an image signal "e" (an integrated value in a period "e").

FIG. 14(*a*) shows an example of an image signal (a display signal) of display device 1 and an image signal (a shooting signal) output from camera unit 21 of reception device 2 at the time when the integration period of camera unit 21 is delayed by a ½ period with respect to the sub-frames displayed on display device 1. FIG. 14(*b*) shows an example of an image signal output from subtracter 25 of reception device 2 at the time when the integration period of camera unit 21 is delayed by a ½ period with respect to the sub-frames displayed on display device 1. FIG. 14(*b*) shows an absolute value of the difference between an image signal "i" (an integrated value in a period "i") and an image signal "j" (an integrated value in a period "j") shown in FIG. 14(*a*), an absolute value of the difference between the image signal "j" (the integrated value in the period "j") and an image signal "k" (an integrated value in a period "k"), an absolute value of the difference between the image signal "k" (the integrated value in the period "k") and an image signal "l" (an integrated value in a period "l"), and an absolute value of the difference between the image signal "l" (the integrated value in the period "l") and an image signal "m" (an integrated value in a period "m").

As shown in FIG. 13(b) and FIG. 14(b), in the fourth exemplary embodiment, as in the first exemplary embodiment to the third exemplary embodiment, irrespective of whether the integration period of camera unit 21 and the sub-frames displayed on display device 1 synchronize with each other, if the difference between the image signal corresponding to the first sub-frame and the image signal corresponding to the second sub-frame is calculated, the image signal of the embedded image is obtained.

According to the fourth exemplary embodiment, as in the first to third exemplary embodiments, it is possible to perform visible light communication with simple means without spoiling the appearance of a public image and without using a synchronization signal or the like. Since the number of sub-frames is large compared with the first to third exemplary embodiments, flicker of the basic image is further reduced for a user who looks at display device 1 without using an optical shutter.

For example, when display device 1 divides one frame into six sub-frames and repeatedly displays three kinds of sub-frames twice, if reception device 2 shoots an image displayed on display device 1 in each period which is the same as the period of one frame divided into three sub-frames, unless the condition that all signal levels of the embedded image are different as in the second exemplary embodiment is not satisfied, the embedded image is obtained by calculating the difference among image signals of the sub-frames. However, in this case, as in the case explained above, the sum of signal levels of an embedded image in the same frame needs to be set to zero.

When display device 1 divides one frame into two sub-frames and displays the sub-frames, control device 3 superimposes image signals of an embedded image on an image signal of a basic image in a positive direction in one sub-frame and causes display device 1 to display the embedded image and superimposes image signals of the embedded image on the image signal of the basic image at the same signal level in a negative direction in the other sub-frame and causes display device 1 to display the embedded image. At this point, if a shooting period of reception device 2 deviates by a ½ period with respect to a display period of the sub-frames of display device 1, the image signals of the embedded image included in the image signals output from camera unit 21 are offset. Therefore, when one frame is divided into two sub-frames and displayed, it is necessary to shift the shooting period of reception device 2 or amplify an image signal corresponding to one sub-frame output from camera unit 21.

Although an example in which the embedded image is obtained by calculating the difference between two image signals continuously output from camera unit 21 or the difference between an integrated signal and an image signal output following the integrated signal is explained in the second exemplary embodiment to the fourth exemplary embodiment, if the signal level of the embedded image for each of the sub-frames is different, the embedded image can also be obtained by calculating the difference between image signals of two arbitrary sub-frames in one frame. However, like image signals of two sub-frames having a relation in which embedded images are offset, for example, the image signal "b" and the image signal "c" shown in FIG. 4(a), image signals of two sub-frames in which signal levels of the embedded image are the same and the embedded image is superimposed on the image signal of the basic image in the positive direction and the negative direction cannot be used for processing for acquiring the embedded image.

The present invention is explained above with reference to the exemplary embodiments. However, the present invention is not limited to the exemplary embodiments. The configuration and the details of the present invention can be changed, as those skilled in the art can understand, in various ways within the scope of the present invention.

This application claims the priority based on Japanese Patent Application No. 2008-059984 filed Mar. 10, 2008, the disclosure of which is incorporated herein by reference in its entirety.

The invention claimed is:

1. A communication system comprising:
    a control device that divides one frame into plural sub-frames, distributes image signals of a first image to the plural sub-frames such that a sum of signal levels in the one frame is zero, superimposes the image signals on an image signal of a second image, and outputs the image signals;
    a display device that displays, for each of the sub-frames, an image based on the image signals output from the control device; and
    a reception device that shoots an image displayed on the display device in each period same as a period of the sub-frames and calculates the difference between two image signals obtained in each period which is the same as the period of the sub-frames to acquire and display the image signals of the first image,
    wherein the reception device adds up image signals obtained in each period which is the same as the period of the sub-frames to acquire and display the image signal of the second image, and
    wherein, when a number of sub-frames in the one frame is represented as n, where n is an integer number equal to or greater than 3, the reception device includes:
        a sub-frame memory that stores an integrated signal obtained by adding up a first image signal obtained in each period that is the same as the period of the sub-frame in the one frame and the n−1th image signal;
        an amplifier that multiplies a signal level of the nth image signal in the one frame by n−1; and
        a subtracter that calculates the difference between the integrated signal stored in the sub-frame memory and an image signal output from the amplifier and outputs the image signals of the first image.

2. The communication system according to claim 1, wherein a sum of signal levels of the image signals of the first image displayed in the sub-frames in the one frame is zero and the signal levels of the image signals displayed in the sub-frames of the frame are different from one another.

3. A reception device that shoots an image displayed on a display device, which divides one frame into plural sub-frames and displays a first image and a second image, and extracts and displays the first image or the second image, the reception device comprising:
    a camera unit that shoots the image displayed on the display device in each period that is the same as the period of the sub-frame;
    a sub-frame memory that sequentially stores image signals output from the camera unit in each period that is the same as the period of the sub-frame;
    a subtracter that calculates the difference between two image signals stored in the sub-frame memory and outputs image signals of the first image; and an adder that adds up the image signals sequentially output from the camera unit and obtained in each period that is the same as the period of the sub-frame and outputs an image signal of the second image, wherein, when a number of sub-frames in the one frame is represented as n, where n is an integer number equal to or greater than 3, the camera unit outputs, among image signals shot in each period that is the same as the period of the sub-frame, an integrated signal obtained by adding up image signals obtained in a continuous period of n−1, the reception device includes an amplifier that multiplies a signal level of an image signal output following the integrated signal from the camera unit by n−1, the sub-frame memory stores the integrated signal, and the subtracter calculates the difference between the integrated signal stored in the sub-frame memory and an image signal output from the amplifier and outputs the image signals of the first image.

4. The reception device according to claim 3, wherein the camera unit supplies, among image signals shot in each period that is the same as the period of the sub-frame, an image signal not used for acquisition of the image signals of the first image to the adder.

5. The reception device according to claim 3, wherein the camera unit outputs an integrated signal obtained by adding up, among image signals shot in each period same as the period of the sub-frames, image signals obtained in continuous two periods, and the subtracter calculates the difference between the integrated signal stored in the sub-frame memory and an image signal output from an amplifier and outputs the image signal of the first image.

6. The reception device according to claim 3, wherein a sum of signal levels of the image signals displayed in the sub-frames in the one frame is zero and signal levels of the image signals displayed in the sub-frames of the frame are different from one another.

* * * * *

UNITED STATES PATENT AND TRADEMARK OFFICE
CERTIFICATE OF CORRECTION

PATENT NO. : 8,648,911 B2  Page 1 of 1
APPLICATION NO. : 12/920166
DATED : February 11, 2014
INVENTOR(S) : Fujio Okumura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this
Twenty-ninth Day of September, 2015

Michelle K. Lee
*Director of the United States Patent and Trademark Office*